United States Patent [19]

Yamawaki

[11] Patent Number: 5,168,327
[45] Date of Patent: Dec. 1, 1992

[54] IMAGING DEVICE

[75] Inventor: Masao Yamawaki, Itami, Japan

[73] Assignee: Mitsubishi Denki Kabushiki Kaisha, Tokyo, Japan

[21] Appl. No.: 647,345

[22] Filed: Jan. 29, 1991

[30] Foreign Application Priority Data

Apr. 4, 1990 [JP] Japan .................................. 2-90948

[51] Int. Cl.$^5$ .............................................. G01B 11/24
[52] U.S. Cl. ................................ 356/376; 250/201.8
[58] Field of Search ................................ 356/375, 376; 250/201.8

[56] References Cited

U.S. PATENT DOCUMENTS

| 4,543,476 | 9/1985 | Horikawa | 250/201.8 |
| 4,633,073 | 12/1986 | Horikawa | 250/201.8 |
| 4,645,347 | 2/1987 | Rioux | 356/376 |
| 5,018,854 | 5/1991 | Rioux | 356/375 |

FOREIGN PATENT DOCUMENTS 824107  4/1981  U.S.S.R. ............................... 356/375

OTHER PUBLICATIONS

Blais et al, "BIRIS: A Simple 3-D Sensor", SPIE, vol. 728, Optics . . . for Machine Vision, 1986, pp. 235-242.
Blais et al, "Real-Time Data . . . 3-D Vision", SPIE, vol. 829, Applications . . . Image Processing, 1987, pp. 72-79.

*Primary Examiner*—Richard A. Rosenberger
*Attorney, Agent, or Firm*—Leydig, Voit & Mayer

[57] ABSTRACT

An imaging device for measuring the three-dimensional configuration of an object includes a mask having two optical windows, a lens which receives light which has passed through the windows, and an imaging element which receives the light collected by the lens. In addition, color filters having different spectral transmittance characteristics are provided on the two optical windows of the mask and another color filter having portions with spectral transmittance characteristics corresponding to the respective spectral transmittance characteristics of the filters on the windows is provided on the imaging element. A shutter for controlling the respective light transmissivities of the two optical windows of the mask may be provided alternatively or in conjunction with the filters to control the transmissivities of the windows, especially in synchronization with scanning of the imaging element across the light beams from the windows.

9 Claims, 10 Drawing Sheets

IMAGING DEVICE

FIELD OF THE INVENTION

The present invention relates to an imaging device and more particularly, to an imaging device for measuring the distance from a reference plane to an object and measuring three-dimensional configuration of the object.

BACKGROUND OF THE INVENTION

With improvements in resolution of solid state imaging elements, imaging elements are used not only for conventional general purposes but also for precise industrial measurements. For example, FIG. 9 shows an imaging device for measuring the three-dimensional configuration of an object invented by F. Blais et al., which is described in "SPIE vol. 728 Optics, Illumination, and Image Sensing for Machine Vision (1986), pp. 235 to 242". In FIG. 9, reference numeral 1 designates a mask having optical windows separating incident light into two beams disposed in front of an imaging device. A lens for imaging 2 is provided behind the mask 1. A solid state imaging element 9 of high resolution is provided behind the lens 2. Reference numeral 4 designates a reference plane and reference numeral 5 designates an object.

A description is given of the operation hereinafter.

As shown in FIG. 9, an optical system is adjusted such that a point A on the reference plane 4 is focused on a point A' on the imaging element 9 such as a CCD. In this state, when the object 5 is positioned at point B, reflected light at point B is focused as double images at points b and b' (corresponding to broken lines in FIG. 9) on an imaging plane of the imaging element 9.

FIG. 11 is a diagram showing the measurement of reflected light as optical information at three points $B_1$, $B_2$, $B_3$ of object 5 for explaining this measurement principle in detail. The reflected light from point $B_1$ spaced apart from a reference plane by $\Delta L_1$ is focused as double images at points $b_1$ and $b'_1$ on the imaging plane. Reflected light from points $B_2$ and $B_3$ spaced apart from the reference plane 4 by $\Delta L_2$ and $\Delta L_3$ ($\Delta L_1 > \Delta L_2 > \Delta L_3$) are respectively focused as double images at points $b_2$ and $b'_2$ and points $b_3$ and $b'_3$ on the imaging plane. Here, the relation between the length differences in respective double images $\Delta d_1$, $\Delta d_2$, $\Delta d_3$ is $\Delta d_1 > \Delta d_2 > \Delta d_3$, and it is found that the distance from reference plane 4 to object 5 ($\Delta L$) is directly proportional to the length difference of the double images ($\Delta d$) on the imaging plane. Therefore, it is possible to obtain the three-dimensional configuration of the object by measuring the length difference $\Delta d$ taking into consideration the repetition of the picture elements from image information. Thus, the distance information can be measured by an imaging device of a simple structure.

In the prior art imaging device constructed as described above, although correct information is obtained when the object 5 is positioned on the same side of the references plane 4 as the imaging element 9, incorrect information results when the object 5 is positioned on the side of reference plane 4 opposite to the imaging element 9 (the left side of the reference plane 4 in FIG. 9). In other words, as shown in FIG. 10, when the object material 5 is positioned at the left side of the reference plane 4, the object material 5 is focused at point B' on the left of point A' and an image having points b and b' replaced those of FIG. 9 is projected onto an imaging plane. This means that the points b and b' only come to positions reverse to each other when the object 5 is spaced apart from the reference plane 4 by $\Delta L$ toward the imaging element 9 (FIG. 9) relative to a case when the object 5 is spaced apart from the reference plane 4 on the side opposite to the imaging element 9 by the same distance $\Delta L$ (FIG. 10), and the double images actually projected onto the imaging plane are the same. Therefore, when the object 5 is located on the opposite side of the reference plane 4 from the imaging element incorrect distance information results, thereby reducing the precision of the imaging device.

The problem especially influences measurement precision when the object 5 is a moving target. For example, when the imaging device is used as an imaging device for measuring the distance to a robot, the establishment of the reference plane is difficult, resulting in difficulty in the measurement. If the reference plane is set at a position sufficiently far in order to avoid this problem, the change rate of $\Delta d$ relative to $\Delta L$ decreases, which reduces measurement precision. FIG. 12 shows the measurement result of the difference between the double images which are measured where the reference plane is set sufficiently far from the imaging plane and in a case where the reference plane is set in the neighborhood of the imaging plane, for an object (robot) which is spaced by $\Delta L$ from the reference plane. As shown in the figure, the length difference $\Delta d_5$ between the double images ($b_5$, $b'_5$) of the object in a case where the reference plane is set sufficiently far from the imaging plane is fairly small compared with the length difference $\Delta d_4$ between the double images ($b_4$, $b'_4$) in a case where the reference plane is set in the neighborhood of the imaging plane. In this way, in order to increase the change rate of $\Delta d$ relative to $\Delta L$ and keep a high measurement precision, the reference plane should be set in the measureable range and this results in a problem with measurement precision.

SUMMARY OF THE INVENTION

The present invention is directed to solving the problems described above and has for its object to provide an imaging device that can detect the positional relation between the reference plane and the object with high precision.

Another object of the present invention is to provide an imaging device that is simple and has high measurement precision.

Other objects and advantages of the present invention will be become apparent from the detailed description given hereinafter; it should be understood, however, that the detailed description and specific embodiment are given by way of illustration only, since various changes and modifications within the spirit and scope of the invention will become apparent to those skilled in the art from this detailed description.

In accordance with an aspect of the present invention, an imaging device has a mask having two optical windows for separating reflected light from an object, a lens which receives light which has passed through the optical windows, and an imaging element which receives light collected by the lens and measures the distance from the reference plane to the object to obtain a three-dimensional configuration of the object material, having different spectral transmittance characteristics are arranged on the two optical windows of the mask. Spectrally sensitive elements having spectral transmittance characteristics corresponding to the spectral transmittance characteristics of the elements disposed on the windows are further provided on the surface of the imaging element.

In accordance with another aspect of the present invention, an imaging device has control means for controlling the light transmissivity of the two optical windows of the mask, and the light transmittance characteristics are controlled so that the transmissivities of the two windows are opposite each other in synchronization with movement of the imaging element.

In accordance with the present invention, it can be determined which optical window the incident light on the imaging plane has come from and the general purpose distance measurement can be performed with high precision.

DETAILED DESCRIPTION OF THE PREFERRED EMBODIMENTS

An embodiment of the present invention will be described in detail with reference to the drawings.

Figure 1:
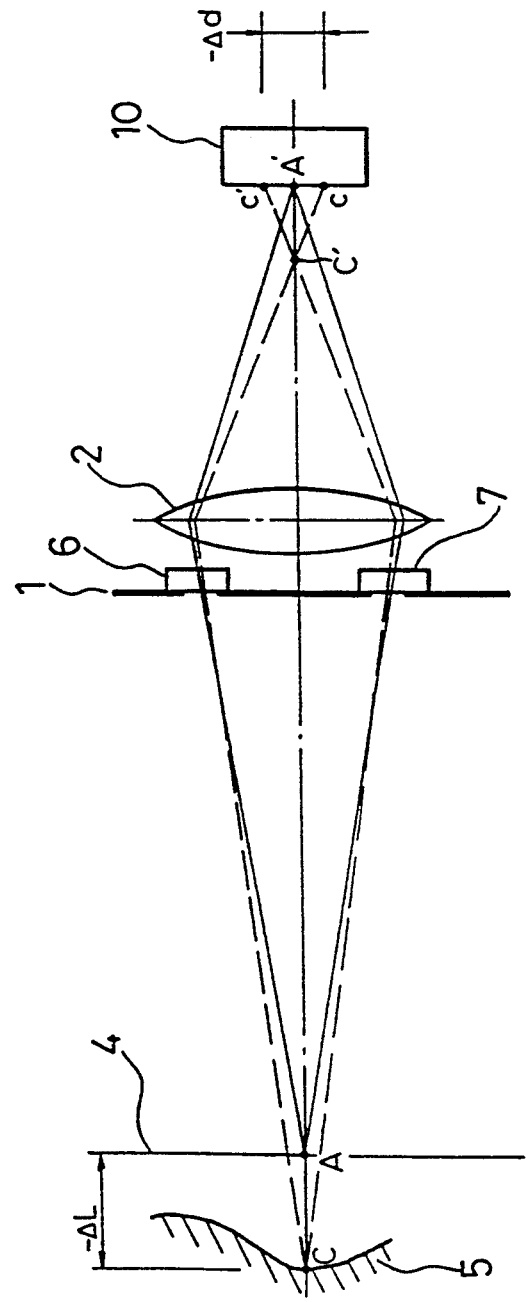
FIG. 1 is a diagram showing an imaging device according to a first embodiment of present invention.
Figure 9:
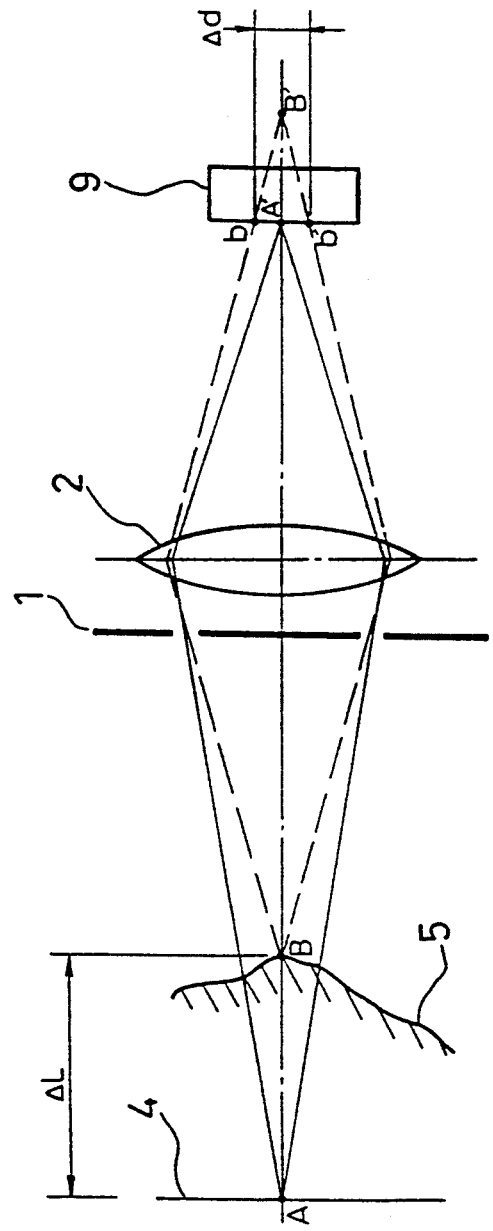
FIGS. 9 and 10 are diagrams showing imaging devices according to the prior art.
Figure 10:
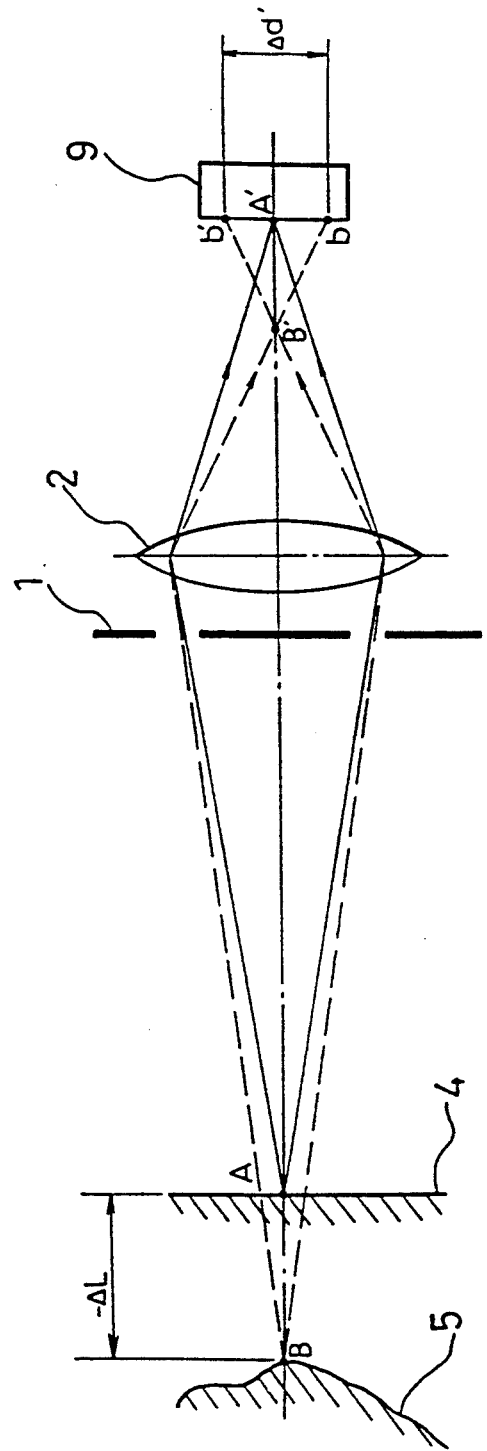
Figure 11:
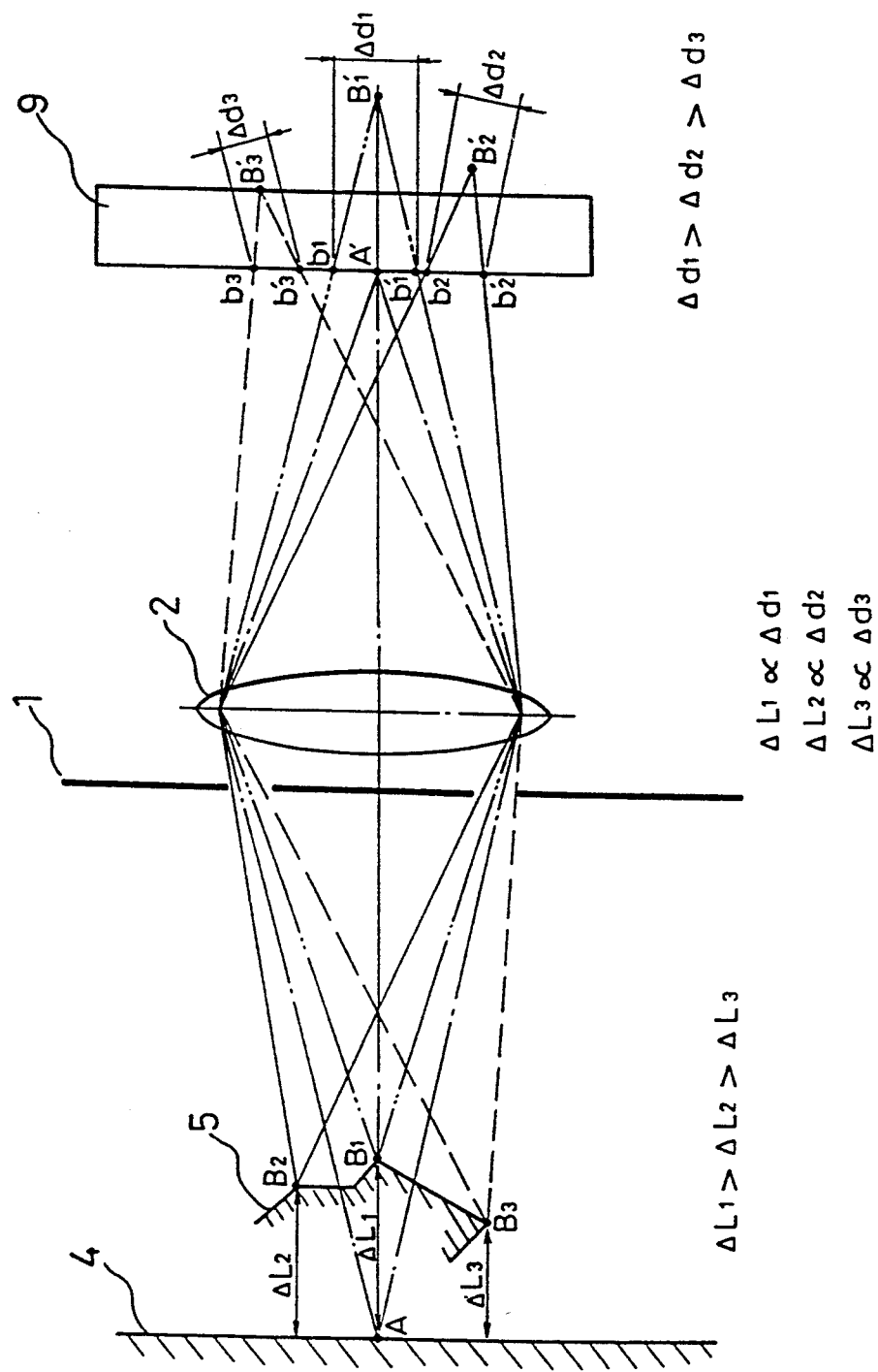
FIG. 11 is a diagram showing the principle of of a prior art imaging device.
Figure 12:
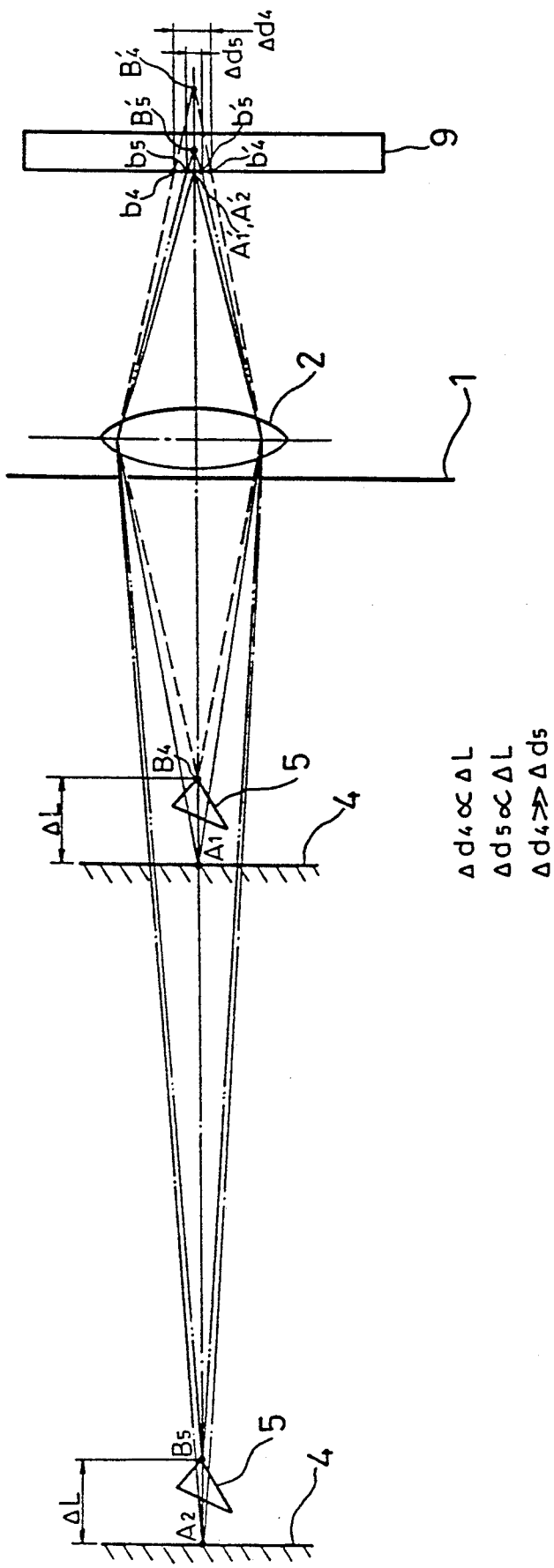
FIG. 12 is a diagram explaining conventional image device problems.

FIG. 1 shows a construction of an imaging device in accordance with a first embodiment of the present invention. In FIG. 1, the same reference numbers as those shown in FIG. 9 designate the same or corresponding portions. Reference numerals 6 and 7 designate color filters having different spectral transmittance characteristics which are provided on the two optical windows of the mask 1, respectively. For example, the color filter 6 has spectral transmittance characteristic of transmitting red light, and the color filter 7 has spectral transmittance characteristic of transmitting blue light. Reference numeral 10 designates a color imaging element having a color resolving filter.

A description is given of the operation.

As similarly in the prior art device, an optical system is adjusted such that the point A on the reference plane is focused to the point A' on the imaging plane. When an object is positioned at the left side of the reference plane (point C), the point C is focused on the point C' and it is possible to determine which optical window the light has been transmitted through because of the color filters 6 and 7. That is, when red light is incident on the point c and blue light incident on the point c', it can be seen that the object material is located at a far point (left side in the drawing) relative to the reference plane. On the other hand, when blue light is incident on the point c and red light incident on the point c', it can be seen that the object is located at a near point (right side in the drawing) relative to the reference plane. By taking this color information into the color imaging element 10, the distance information in the neighborhood of the reference plane can be measured with high precision.

Figure 2A:
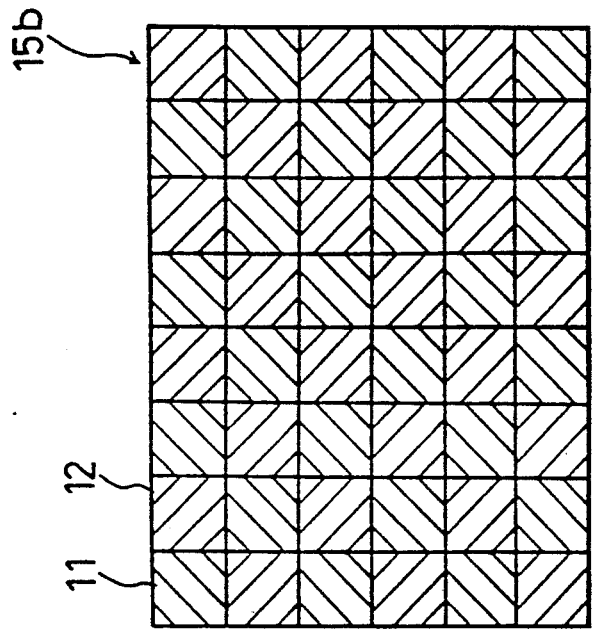
FIGS. 2(a) and 2(b) are diagrams showing arrangements of a color filters provided on a surface of the imaging element shown in FIG. 1.
Figure 2B:
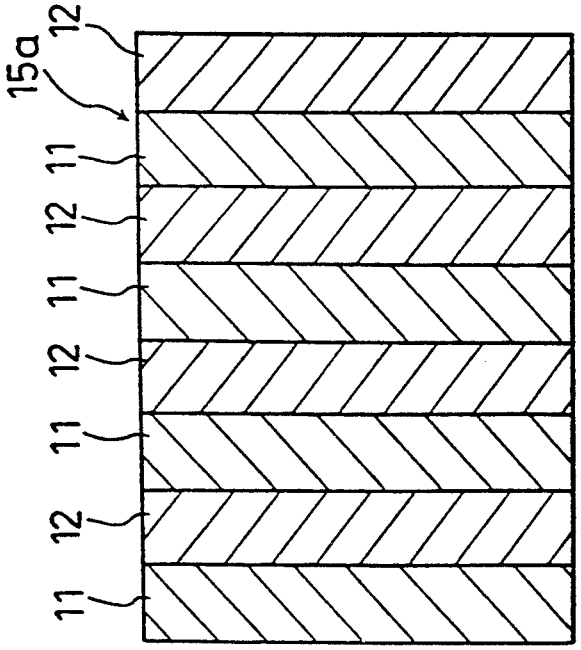

In addition, as the color imaging element 10, an element having a two-dimensional color filter having a stripe or mosaic arrangement as shown by 15a and 15b in FIGS. 2(a) and 2(b) is mounted on a two-dimensional opto-electric conversion element. The light which has passed through the blue color filter 6 provided on the optical window of the mask 1 is transmitted by the blue color filter 11 on the color imaging element, while the light which has passed through the red color filter 7 of the mask is transmitted by the red color filter 12, and thereafter both are input as imaging information. In the imaging element to which the image information is thus input, it is possible to resolve the color imaging information as respective color signals in reading out of the color image information. Thereafter, this information is processed by a signal processing computer and three-dimensional distance information can be extracted from the signal.

In a case where the structure of the object has a large directionality in the longitudinal direction, a two-dimensional color filter 15a comprising a stripe arrangement having a high horizontal direction resolution is preferable. When the object is unknown, the two-dimensional color filter 15b comprising a mosaic shaped arrangement having approximately equal horizontal and vertical direction resolutions is preferable. These can be used in accordance with an object to be imaged.

In the above-illustrated embodiment, a two-dimensional imaging element is used for imaging, but one-dimensional imaging element can be used with the same effects as described above.

Figure 3:
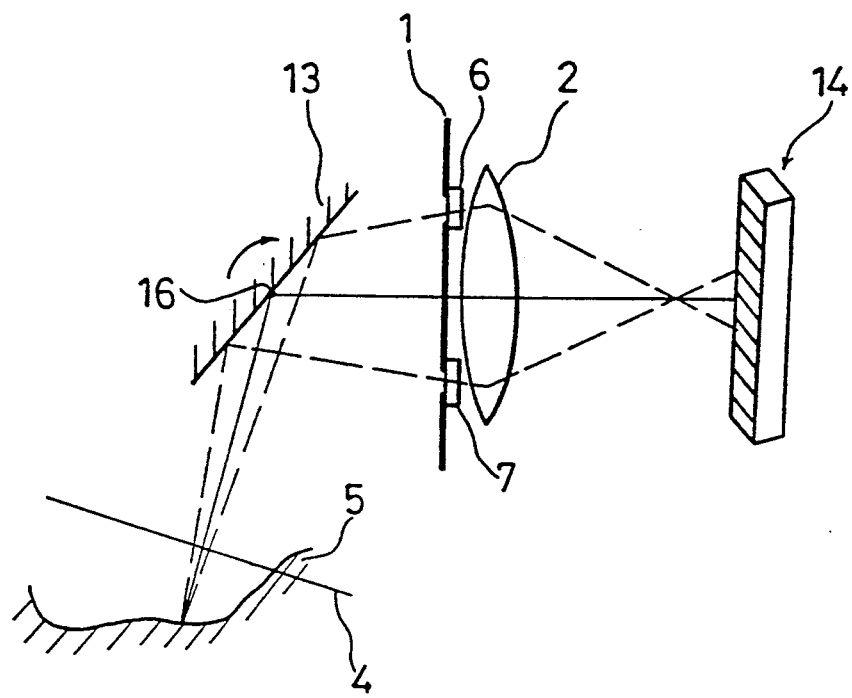
FIG. 3 is a diagram showing an imaging device according to a second embodiment of present invention.
Figure 4:
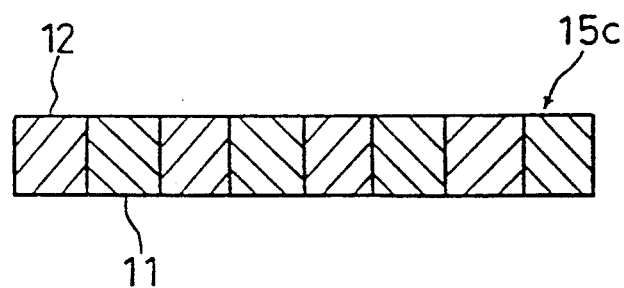
FIG. 4 is a diagram showing an arrangement of color filter provided on the surface of the imaging device shown in FIG. 3.

FIG. 3 shows an imaging device using a one-dimensional imaging element having spectral means in accordance with a second embodiment of the present invention. In FIG. 3, reference numeral 13 designates a scanning device for scanning the incident light mechanically by using a mirror. Reference numeral 14 designates a one-dimensional color imaging element. FIG. 4 shows an example of a color filter arrangement provided on the color imaging element 14. The imaging principle is the same as that shown in FIG. 1. That is, the object 5 is imaged by driving the scanning device 13 repetively through single lines, the imaging information is input to a signal processing computer, and the information is dealt with as two-dimensional imaging information by a memory inside the computer. Here, although the rotation axis of the scanning device is perpendicular to the paper face in FIG. 3 in order to simplify the explanation of the operational principle, when a two-dimensional picture image is imaged, the scanning device 13 is required to rotate around a rotation axis perpendicular to the paper face and further to rotate around a rotation axis parallel to the paper face.

While, in the above-illustrated first and second embodiments color filters are provided on the optical windows of the mask 1 to determine which window the light has passed through, and optical shutter comprising a liquid crystal can be used in place of the color filter.

Figure 5:
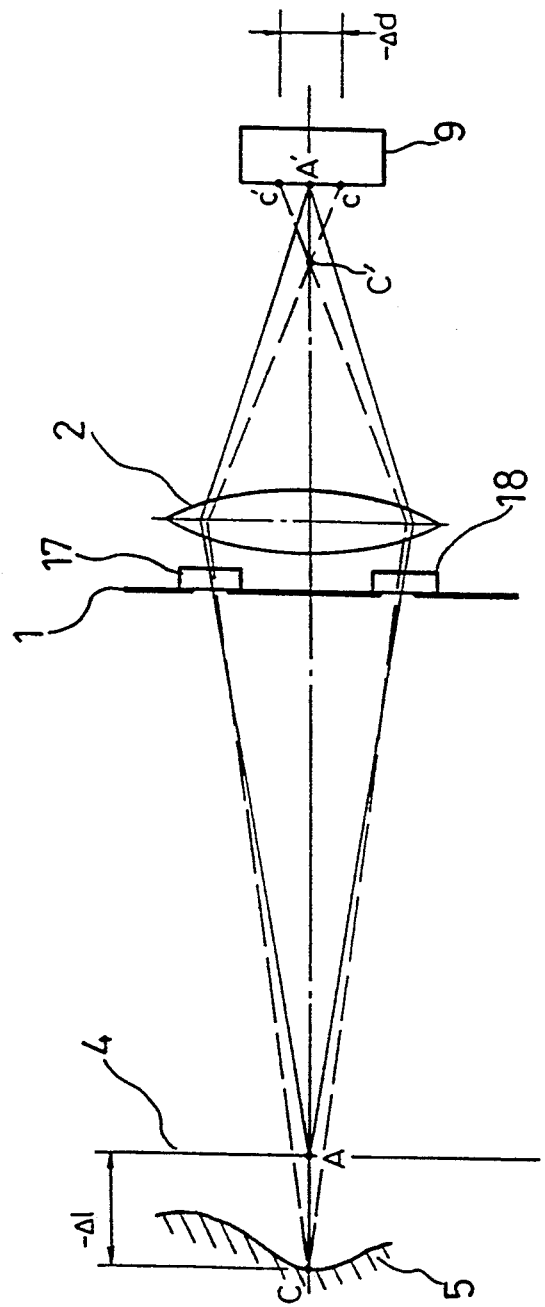
FIG. 5 is a diagram showing an imaging device according to a third embodiment of present invention.

FIG. 5 shows a structure of an imaging device in accordance with a third embodiment of present invention. Here, optical shutters comprising liquid crystals 17 and 18 are provided on two optical windows of the mask. Reference numeral 9 designates an imaging element.

A description is given of the operational principle.

Figure 6:
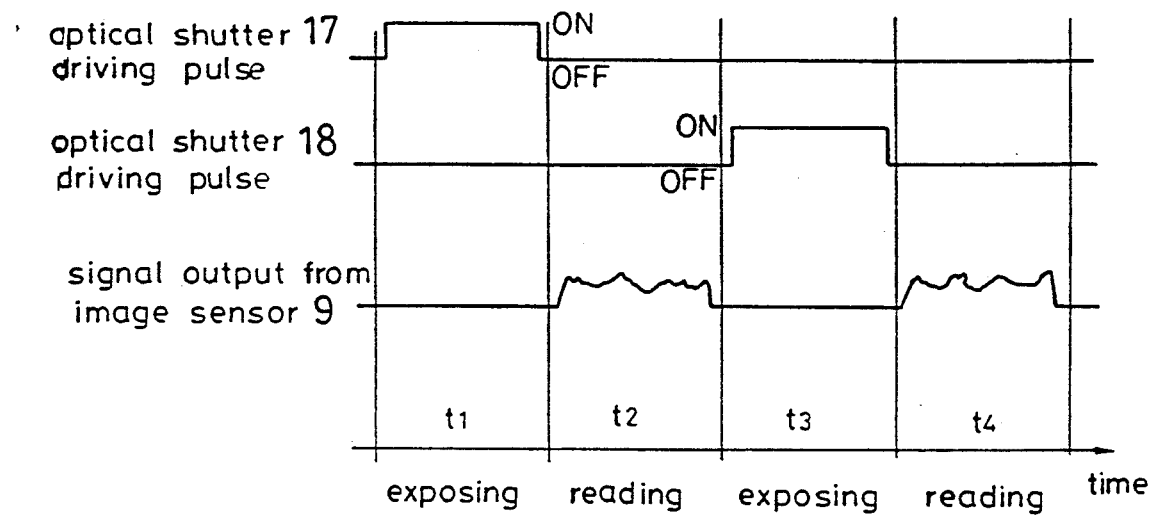
FIGS. 6 and 7 are time charts showing the operation of the imaging device.

FIG. 6 is a time chart explaining an imaging principle. The first imaging is performed in a state where a liquid crystal optical shutter 17 is turned ON and a liquid crystal optical shutter 18 is turned OFF ($t_1$ period). This imaging information is read out and memorized in a memory of the computer ($t_2$ period). Next, the liquid crystal optical shutter 18 is turned ON, the liquid crystal optical shutter 17 is turned OFF, the imaging information obtained in this state is read out to another memory of computer ($t_3$ and $t_4$ periods), and thereafter this information is processed with the information memorized before.

According to this method, it is possible to determine which window the light has come from as time division information, and information is obtained which is equivalent to the information which is obtained by utilizing the above described color filters, whereby three-dimensional distance information can be extracted.

Where color filters are used, the information from the respective optical windows is spacially separated as color signals on the imaging device and memorized as shown in FIG. 2. Therefore, the information of the respective windows is obtained only with half, i.e., 2 pixel, resolution. However, where liquid crystal shutters are used, the information of the respective optical windows can be collected at all pixels, so that the resolution is doubled as compared with the resolution using color filters and the measurement can be realized with high precision.

Figure 7:
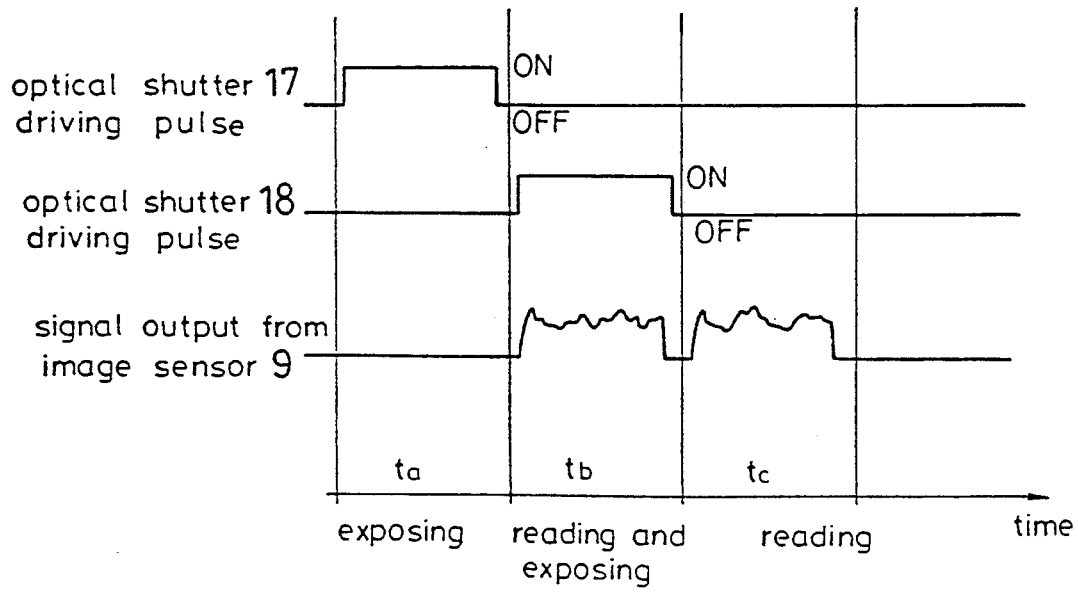

Here, in a case of using color filters, it is possible to input image information in only one imaging and one reading, but in a case of using optical shutters, it takes a longer time for inputting information, as shown in FIG. 6. An example for inputting image information in a shorter time by using liquid crystal optical shutters is shown in FIG. 7. Since an imaging operation can be performed while reading out previous image information by using a CCD imaging device, the first imaging is performed in a period $t_a$ and the second imaging is performed while reading out signals in period $t_b$ as shown in FIG. 7. Next, a second signal is read out in period $t_c$. While the ordinary solid state imaging element requires 1/60 second for imaging and reading out, the driving method shown in FIG. 7 enables inputting of information in ¾ of the driving time as compared with the case shown in FIG. 6.

Here, it is desirable to select, depending on the purpose, which of the spectrally sensitive means of the first embodiment or the light passage means using an optical shutter of the third embodiment is to be used, since each means has the above described individual characteristics. For example, when high speed operation is requested, the spectrally sensitive means comprising a color filter having a short driving time should be used, and when a high resolution is requested, the light passage means comprising the optical shutter should be used.

In the above-described embodiments, a solid state imaging element is used as an imaging element, but an imaging device comprising an imaging tube can be used with the same effects as described above.

Furthermore, in the above-described first and second embodiments, red and blue color filters are used, but the use of color filters having light transmittance characteristics different from each other such as red and green, produces the same effects. By using light having different wavelengths, imaging not by visible light, but by near infrared light, can also be used to obtain the same effects.

In the third embodiment, a liquid crystal is used as optical shutter, but a mechanical shutter which operates in synchronization with the imaging device, or an optical shutter utilizing acoustic optical effects can be used with the same effects as described above.

Figure 8:
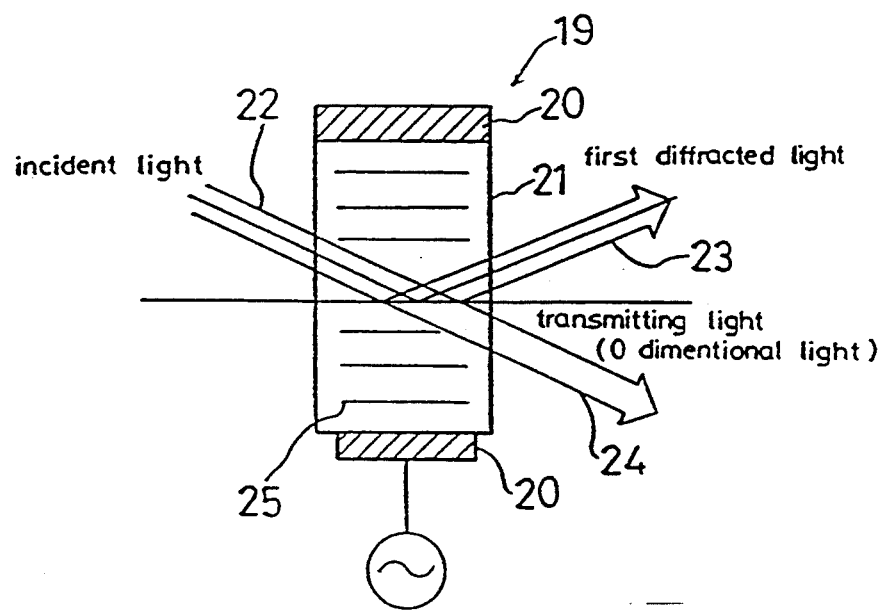
FIG. 8 is a diagram showing an embodiment an optical shutter.

FIG. 8 shows an example of an optical shutter utilizing acoustic optical effects. In FIG. 8, reference numeral 19 designates an element having an acoustic optical property which comprises electrodes 20 and an acoustic optical medium 21. This element 19 generates acoustic waves 25 in an acoustic optical medium 21 when high voltage pulses are applied to electrodes 20 and the acoustic waves 25 diffract light propagating through the medium 21. In other words, this element 19 can be used as an optical shutter in which transmitted light is controlled depending on whether acoustic waves are generated.

Furthermore, in the above-described second embodiment an example using a one-dimensional color imaging element is described. However, even in an imaging device using optical shutters, it is possible to arrange imaging elements to image the object one-dimensionally, by driving a scanning apparatus one line at a time similar to using color filters, and to treat that image as two-dimensional imaging information inside a computer for signal processing.

As is evident from the foregoing description, according to the present invention, spectrally sensitive means having selective spectral transmittance characteristics such as color filters are provided on respective optical windows of a mask, and spectrally sensitive means having different spectral transmittance characteristics corresponding to the above described spectral transmittance characteristics are provided on the imaging element, and distance information for the object relative to a reference plane can be obtained by imaging. On the other hand, control means for controlling respective light transmissivities of the two optical windows on the mask is provided to control the light transmittance characteristics of the respective windows in synchronization with movement of the imaging element. Therefore, it is possible to determine exactly whether the object is positioned on the side of the imaging plane relative to the reference plane or on the opposite side thereof, and distance information can be easily obtained with high precision.

What is claimed is:

1. An imaging device for measuring a three-dimensional configuration of an object comprising:
    a mask having first and second optical windows for separating light reflected from an object into two beams;
    a lens for collecting the light which has passed through said first and second optical windows;
    an imaging element for receiving the light collected by said lens;
    first and second spectrally sensitive means having different spectral light transmittance characteristics disposed on said first and second optical windows of said mask, respectively; and third spectrally sensitive means including portions having spectral transmittance characteristics corresponding to the respective spectral transmittance characteristics of said first and second spectrally sensitive means disposed on said imaging element.

2. An imaging device as defined in claim 1 wherein said first, second, and third spectrally sensitive means comprise color filters.

3. An imaging device as defined in claim 1 wherein said imaging element comprises one of a solid state imaging element and an imaging tube.

4. An imaging device as defined in claim 1 wherein the three-dimensional configuration of the object is measured by measuring the distance between images of the object formed on said imaging element and measuring the distance from the object to a reference plane proximate the object utilizing a previously measured distance between images formed on said imaging element.

5. An imaging device for measuring a three-dimensional configuration of an object comprising:
   a mask having first and second optical windows for separating light reflected from an object into two beams;
   a lens for collecting the light which has passed through said first and second optical windows;
   an imaging element for receiving the light collected by said lens;
   first and second spectrally sensitive means having different spectral light transmittance characteristics disposed on said first and second optical windows of said mask, respectively; and
   third spectrally sensitive means including portions having spectral transmittance characteristics corresponding to the respective spectral transmittance characteristics of the first and second spectrally sensitive means comprising a color filter disposed on said imaging element and having spectral transmission characteristics that vary along two generally orthogonal directions.

6. An imaging device as defined in claim 5 wherein said color filter comprises a plurality of color filter elements, each element having substantially uniform spectral transmission characteristics, and wherein said color filter elements are arranged in one of a multiple stripe and mosaic pattern.

7. An imaging device for measuring a three-dimensional configuration of an object comprising:
   a mask having first and second optical windows for separating light reflected from an object into two beams;
   a lens for collecting the light which has passed through said first and second optical windows;
   an imaging element for receiving the light collected by said lens;
   first and second spectrally sensitive means having different spectral light transmittance characteristics disposed on said first and second optical windows of said mask, respectively; and
   third spectrally sensitive means including portions having spectral transmittance characteristics corresponding to the respective spectral transmittance characteristics of the first and second spectrally sensitive means comprising a color filter disposed on said imaging element and having spectral transmission characteristics that vary along one direction.

8. An imaging device as defined in claim 7 comprising a scanning device for mechanically scanning said imaging element.

9. An imaging device as defined in claim 7 wherein said color filter comprises two color filter elements, each filter element having substantially uniform spectral transmission characteristics, and wherein said filter elements are arranged side-by-side.

* * * * *